United States Patent
DelDuca et al.

(10) Patent No.: US 6,231,905 B1
(45) Date of Patent: *May 15, 2001

(54) SYSTEM AND METHOD OF MAKING A MODIFIED ATMOSPHERE PACKAGE COMPRISING AN ACTIVATED OXYGEN SCAVENGER FOR PACKAGING MEAT

(76) Inventors: Gary R. DelDuca, 82 Howell St., Canandaigua, NY (US) 14424; Alan E. Deyo, 66 S. Main St., Rushville, NY (US) 14544; Vinod K. Luthra, 21 Barrington Hills; Wen P. Wu, 4 Silver Pines Dr., both of Pittsford, NY (US) 14534

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/168,659

(22) Filed: Oct. 8, 1998

(51) Int. Cl.[7] ...................................................... B65B 55/00
(52) U.S. Cl. .......................... 426/118; 426/129; 426/316; 426/319; 426/324; 426/332; 426/396; 426/404; 426/410; 426/415
(58) Field of Search ..................................... 426/118, 129, 426/324, 332, 316, 319, 404, 396, 415, 410; 53/427, 432, 434

(56) References Cited

U.S. PATENT DOCUMENTS

| 4,083,372 | 4/1978 | Boden .......................................... 131/8 |
| 4,127,503 | 11/1978 | Yoshikawa et al. .................... 252/429 |

(List continued on next page.)

FOREIGN PATENT DOCUMENTS

9184759  * 4/1992 (AU).

| 0 457 457 A2 | 11/1991 | (EP). |
| 0 468 880 A1 | 1/1992 | (EP). |
| 0 547 761 A1 | 6/1993 | (EP). |
| 698563 | 2/1996 | (EP). |

(List continued on next page.)

OTHER PUBLICATIONS

Abstract: 0 320 215 0 (Japan) JP Application Date pub Sep. 3, 1991.
Application: 924298; Jun. 12, 1992; De Muelenaere et al.
Gill, "Extending the Storage Life of Raw Chilled Meats," Agriculture and Agri–Food Canada Research Centre; (1990).

(List continued on next page.)

Primary Examiner—Nina Bhat
(74) Attorney, Agent, or Firm—Jenkens & Gilchrist, P.C.

(57) ABSTRACT

A packaging system and method utilizes a modified atmosphere package including a first package and a second package. The first package includes a non-barrier portion substantially permeable to oxygen, while the second package is substantially impermeable to oxygen. After a food product such as raw meat is placed within the first package, the first package is sealed and then inserted into the second package without sealing the second package so as to create a pocket between the first and second packages. The system and method first employ an oxygen reduction technique such as evacuation, gas flushing, and/or scavenging to quickly reduce the oxygen level in the pocket to a first non-zero level, and then employ an activated oxygen scavenger to further reduce the oxygen level to zero percent after the package is sealed. The oxygen scavenger is activated with an oxygen uptake accelerator to increase the rate at which the oxygen is absorbed. The oxygen scavenger is positioned external to the first package to aggressively absorb any residual oxygen within the pocket and the first package and absorb any oxygen that might seep into the modified atmosphere package.

22 Claims, 6 Drawing Sheets

U.S. PATENT DOCUMENTS

| | | | |
|---|---|---|---|
| 4,141,487 | 2/1979 | Faust et al. | 229/43 |
| 4,166,807 | 9/1979 | Komatsu et al. | 252/439 |
| 4,192,773 | 3/1980 | Yoshikawa et al. | 252/429 |
| 4,201,030 | 5/1980 | Mahaffy et al. | 53/432 |
| 4,230,595 | 10/1980 | Yamaji et al. | 252/188 |
| 4,242,659 | 12/1980 | Baxter et al. | 338/28 |
| 4,299,719 | 11/1981 | Aoki et al. | 252/188 |
| 4,308,711 | 1/1982 | Mahaffy et al. | 53/511 |
| 4,317,742 | 3/1982 | Yamaji et al. | 252/188 |
| 4,337,276 | 6/1982 | Nakamura et al. | 426/124 |
| 4,340,138 | 7/1982 | Bernhardt | 206/216 |
| 4,349,999 | 9/1982 | Mahaffy et al. | 53/128 |
| 4,366,179 | 12/1982 | Nawata et al. | 426/395 |
| 4,384,972 | 5/1983 | Nakamura et al. | 252/188.21 |
| 4,406,813 | 9/1983 | Fujishima et al. | 252/188.28 |
| 4,411,122 | 10/1983 | Cornish et al. | 53/436 |
| 4,411,918 | 10/1983 | Cimino et al. | 426/124 |
| 4,424,659 | 1/1984 | Perigo et al. | 53/425 |
| 4,454,945 | 6/1984 | Jabarin et al. | 206/524.3 |
| 4,510,162 | 4/1985 | Nezat | 426/124 |
| 4,517,206 | 5/1985 | Murphy et al. | 426/115 |
| 4,524,015 | 6/1985 | Takahashi et al. | 252/188.8 |
| 4,536,409 | 8/1985 | Farrell et al. | 426/398 |
| 4,543,770 | 10/1985 | Walter et al. | 53/511 |
| 4,564,054 | 1/1986 | Gustavsson | 141/329 |
| 4,574,174 | 3/1986 | McGonigle | 219/10.55 M |
| 4,579,223 | 4/1986 | Otsuka et al. | 206/204 |
| 4,581,764 | 4/1986 | Plock et al. | 383/101 |
| 4,588,561 | 5/1986 | Aswell et al. | 422/238 |
| 4,593,816 | 6/1986 | Langenbeck | 426/395 |
| 4,622,229 | 11/1986 | Toshitsugu | 426/395 |
| 4,622,239 | 11/1986 | Schoenthaler et al. | 427/96 |
| 4,642,239 | 2/1987 | Ferrar et al. | 426/396 |
| 4,645,073 | 2/1987 | Homan | 206/219 |
| 4,657,540 * | 4/1987 | Hayakawa. | |
| 4,657,610 | 4/1987 | Komatsu et al. | 156/87 |
| 4,661,326 | 4/1987 | Schainholz | 426/265 |
| 4,683,139 | 7/1987 | Cheng | 53/433 |
| 4,683,702 | 8/1987 | Vis | 53/433 |
| 4,685,274 | 8/1987 | Garwood | 252/188.28 |
| 4,704,254 | 11/1987 | Nichols | 428/35 |
| 4,711,741 | 12/1987 | Fujishima et al. | 428/35 |
| 4,728,504 | 3/1988 | Nichols | 428/35 |
| 4,737,389 | 4/1988 | Hartsing, Jr. et al. | 428/35 |
| 4,740,402 | 4/1988 | Maeda et al. | 428/35 |
| 4,756,436 | 7/1988 | Morita et al. | 215/228 |
| 4,762,722 | 8/1988 | Izumimoto et al. | 426/124 |
| 4,765,499 | 8/1988 | von Reis et al. | |
| 4,769,175 | 9/1988 | Inoue | 252/188 |
| 4,783,321 | 11/1988 | Spence. | |
| 4,818,548 * | 4/1989 | Cheng | 426/265 |
| 4,820,442 | 4/1989 | Motoyama et al. | 252/188 |
| 4,830,855 | 5/1989 | Stewart | 424/448 |
| 4,830,863 | 5/1989 | Jones | 426/118 |
| 4,836,952 | 6/1989 | Nasu et al. | 252/188.28 |
| 4,840,270 | 6/1989 | Garwood | 206/213.1 |
| 4,842,875 | 6/1989 | Anderson | 426/118 |
| 4,876,146 | 10/1989 | Isaka et al. | 428/347 |
| 4,877,664 | 10/1989 | Maeda et al. | 428/35.9 |
| 4,897,274 | 1/1990 | Candida et al. | 426/127 |
| 4,908,151 | 3/1990 | Inoue et al. | 252/188.28 |
| 4,910,032 | 3/1990 | Antoon, Jr. | 426/118 |
| 4,923,703 | 5/1990 | Antoon, Jr. | 426/118 |
| 4,928,474 | 5/1990 | Schirmer | 53/425 |
| 4,942,048 | 7/1990 | Nasu et al. | 426/27 |
| 4,943,440 | 7/1990 | Armstrong | 426/118 |
| 4,949,847 | 8/1990 | Nagata | 206/484.1 |
| 4,952,451 | 8/1990 | Mueller | 428/218 |
| 4,956,209 | 9/1990 | Isaka et al. | 428/35.2 |
| 4,992,410 | 2/1991 | Cullen et al. | 502/407 |
| 4,996,068 | 2/1991 | Hatakeyama et al. | 426/234 |
| 5,019,212 | 5/1991 | Morita et al. | 162/157.3 |
| 5,021,515 | 6/1991 | Cochran et al. | 525/371 |
| 5,025,611 | 6/1991 | Garwood. | |
| 5,045,331 | 9/1991 | Antoon, Jr. | 426/118 |
| 5,049,624 | 9/1991 | Adams et al. | 525/371 |
| 5,064,698 | 11/1991 | Courtright et al. | 428/35.4 |
| 5,085,878 | 2/1992 | Hatakeyama et al. | 426/107 |
| 5,096,724 | 3/1992 | Zenner et al. | 426/124 |
| 5,101,611 | 4/1992 | Biskup et al. | 53/433 |
| 5,103,618 | 4/1992 | Garwood | 53/433 |
| 5,108,649 | 4/1992 | Matsumoto et al. | 252/188.28 |
| 5,108,656 * | 4/1992 | Schvester et al. | 252/380 |
| 5,110,677 | 5/1992 | Barmore et al. | 428/349 |
| 5,112,674 | 5/1992 | German et al. | 428/216 |
| 5,115,624 | 5/1992 | Garwood | 53/427 |
| 5,116,660 | 5/1992 | Komatsu et al. | 428/192 |
| 5,120,349 | 6/1992 | Stewart et al. | 71/93 |
| 5,120,585 | 6/1992 | Sutter et al. | 428/34.2 |
| 5,124,164 | 6/1992 | Matsumoto et al. | 426/398 |
| 5,128,060 | 7/1992 | Ueno et al. | 252/184 |
| 5,129,512 | 7/1992 | Garwood | 206/213 |
| 5,132,151 | 7/1992 | Graney | 428/40 |
| 5,135,787 | 8/1992 | Bair | 428/36.1 |
| 5,143,763 | 9/1992 | Yamada et al. | 428/36.2 |
| 5,143,769 | 9/1992 | Moriya et al. | 428/76 |
| 5,145,950 | 9/1992 | Funaki et al. | 528/481 |
| 5,151,331 | 9/1992 | Beeson et al. | 428/475.5 |
| 5,153,038 | 10/1992 | Koyama et al. | 428/35.8 |
| 5,155,974 | 10/1992 | Garwood | 53/510 |
| 5,158,537 | 10/1992 | Haak et al. | 604/20 |
| 5,171,593 | 12/1992 | Doyle | 426/106 |
| 5,176,849 | 1/1993 | Hwa et al. | 252/392 |
| 5,176,930 | 1/1993 | Kannankeril et al. | 426/124 |
| 5,194,315 | 3/1993 | Itoh. | |
| 5,202,052 | 4/1993 | Zenner et al. | 252/188.28 |
| 5,204,389 | 4/1993 | Hofeldt et al. | 524/72 |
| 5,207,943 | 5/1993 | Cullen et al. | 252/188.28 |
| 5,211,875 | 5/1993 | Speer et al. | 252/188.28 |
| 5,223,146 | 6/1993 | Kreh | 210/698 |
| 5,226,531 | 7/1993 | Garwood | 206/213 |
| 5,226,735 | 7/1993 | Beliveau | 383/103 |
| 5,227,411 | 7/1993 | Hofeldt et al. | 523/100 |
| 5,236,617 | 8/1993 | Ueno et al. | 252/188.28 |
| 5,239,016 | 8/1993 | Cochran et al. | 525/371 |
| 5,241,149 | 8/1993 | Watanabe et al. | 219/10.55 |
| 5,242,111 | 9/1993 | Nakoneczny et al. | |
| 5,244,600 | 9/1993 | Cuisia et al. | |
| 5,247,746 | 9/1993 | Johnson et al. | |
| 5,250,310 | 10/1993 | Fujino et al. | |
| 5,254,354 | 10/1993 | Stewart. | |
| 5,258,537 | 11/1993 | Takeuchi et al. | |
| 5,262,375 | 11/1993 | McKedy. | |
| 5,270,337 | 12/1993 | Graf. | |
| 5,284,871 | 2/1994 | Graf. | |
| 5,286,407 | 2/1994 | Inoue et al. | |
| 5,288,907 | 2/1994 | Sherwin et al. | |
| 5,290,268 | 3/1994 | Oliver et al. | |
| 5,296,291 | 3/1994 | Mueller. | |
| 5,310,497 | 5/1994 | Ve Speer et al. | |
| 5,320,598 | 6/1994 | Haak et al. | |
| 5,323,590 | 6/1994 | Garwood. | |
| 5,332,590 | 7/1994 | McKedy. | |
| 5,334,405 | 8/1994 | Gorlich. | |
| 5,346,312 | 9/1994 | Mabry et al. | |
| 5,346,644 | 9/1994 | Speer et al. | |
| 5,348,752 | 9/1994 | Gorlich. | |
| 5,350,622 | 9/1994 | Speer et al. | |
| 5,364,555 | 11/1994 | Zenner et al. | |
| 5,364,669 | 11/1994 | Sumida et al. | |
| 5,378,428 | 1/1995 | Inoue et al. | |

| | | |
|---|---|---|
| 5,384,103 | 1/1995 | Miller . |
| 5,390,475 | 2/1995 | Iwauchi et al. . |
| 5,399,289 | 3/1995 | Speer et al. . |
| 5,409,126 | 4/1995 | DeMars . |
| 5,425,896 | 6/1995 | Speer et al. . |
| 5,443,727 | 8/1995 | Gagnon . |
| 5,445,607 | 8/1995 | Venkateshwaran et al. . |
| 5,491,019 | 2/1996 | Kuo . |
| 5,492,705 | 2/1996 | Porchia et al. . |
| 5,492,742 | 2/1996 | Zenner et al. . |
| 5,498,364 | 3/1996 | Speer et al. . |
| 5,501,525 * | 3/1996 | Cox et al. ............................ 383/103 |
| 5,507,379 | 4/1996 | Mazur et al. . |
| 5,510,166 | 4/1996 | Inoue et al. . |
| 5,514,392 | 5/1996 | Garwood . |
| 5,529,833 | 6/1996 | Speer et al. . |
| 5,560,182 * | 10/1996 | Garwood ................................ 53/432 |
| 5,564,974 | 10/1996 | Mazur et al. . |
| 5,580,573 | 12/1996 | Kydonieus et al. . |
| 5,585,129 | 12/1996 | Geddes et al. . |
| 5,603,413 | 2/1997 | Mitchum, Jr. . |
| 5,608,643 | 3/1997 | Wichter et al. . |
| 5,631,036 | 5/1997 | Davis . |
| 5,638,660 | 6/1997 | Kuo . |
| 5,639,815 | 6/1997 | Cochran et al. . |
| 5,643,625 | 7/1997 | Perry et al. . |
| 5,648,020 | 7/1997 | Speer et al. . |
| 5,660,761 | 8/1997 | Katsumoto et al. . |
| 5,665,822 | 9/1997 | Bitler et al. . |
| 5,667,827 | 9/1997 | Breen et al. . |
| 5,667,863 | 9/1997 | Cullen et al. . |
| 5,672,406 | 9/1997 | Challis et al. . |
| 5,686,126 | 11/1997 | Noel et al. . |
| 5,686,127 | 11/1997 | Stockley, III et al. . |
| 5,698,250 | 12/1997 | DelDuca et al. . |
| 5,700,554 | 12/1997 | Speer et al. . |
| 5,711,978 | 1/1998 | Breen et al. . |
| 5,715,169 | 2/1998 | Noguchi . |
| 5,811,142 | 9/1998 | DelDuca et al. . |
| 5,866,184 * | 2/1999 | Gorlich et al. ........................ 426/396 |
| 5,916,613 * | 6/1999 | Stockley, III ......................... 426/124 |
| 5,916,615 * | 6/1999 | Brady et al. .......................... 426/129 |
| 5,948,457 | 9/1999 | DelDuca et al. . |

FOREIGN PATENT DOCUMENTS

| | | |
|---|---|---|
| 1 556 853 | 11/1979 | (GB) . |
| 5-254568 | 10/1983 | (JP) . |
| 63-248678 | 10/1988 | (JP) . |
| 6 278 774 | 10/1994 | (JP) . |
| 6 343 815 | 12/1994 | (JP) . |
| 8804186 * | 5/1990 | (SE) . |

OTHER PUBLICATIONS

Gill et al., "The Use of Oxygen Scavengers to Prevent Transient Discolouration of Ground Beef Package Under Controlled, Oxygen–depleted Atmospheres," *Meat Science* 41(1):19–27 (1995).

Labell, "Controlled & Modified Atmosphere Packaging, Methods for Extending Shelf Life of a Variety of a Food Products," *Food Processing*, Jan. (1985) pp. 152–154.

Ledward, "Metmyoglobin Formation in Beef Stored in Carbon Dioxide Enriched and Oxygen Depleted Atmospheres," *Journal of Food Science* 35:33–37 (1970).

Muller, "Longer Product Shelf Life Using Modified Atmosphere Packaging," *The National Provisioner*, Feb. (1986) pp. 19–22.

Brochure on M–Tek Case–Ready Systems, M–Tek Inc., Elgin, Illinois; date unknown.

* cited by examiner

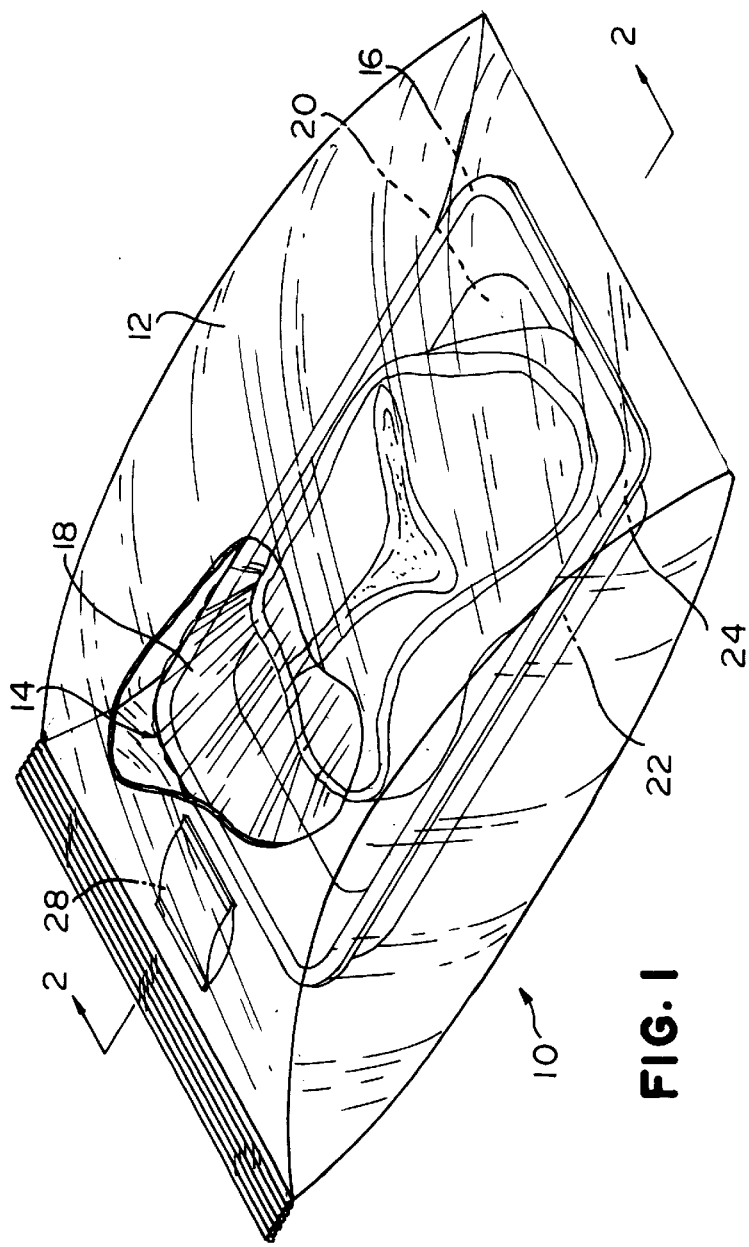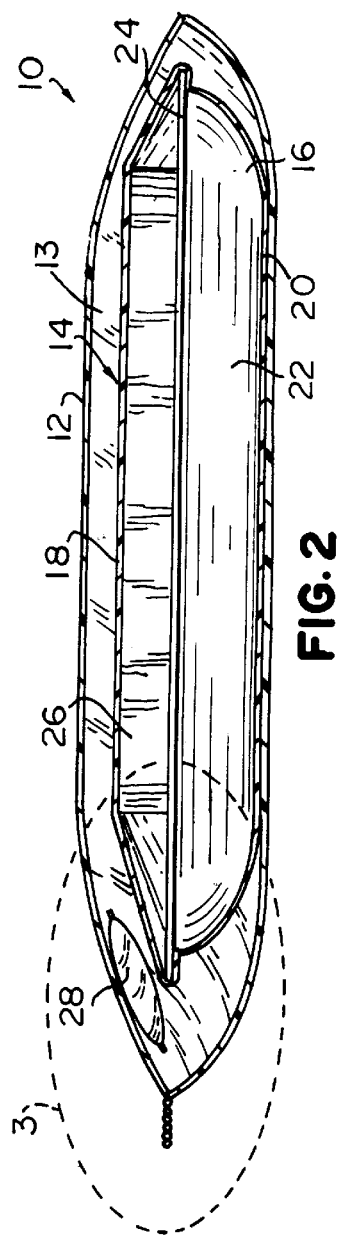

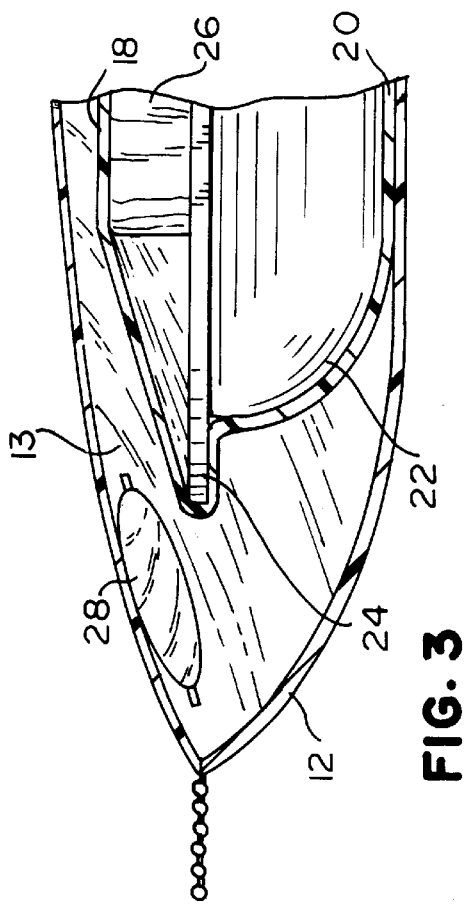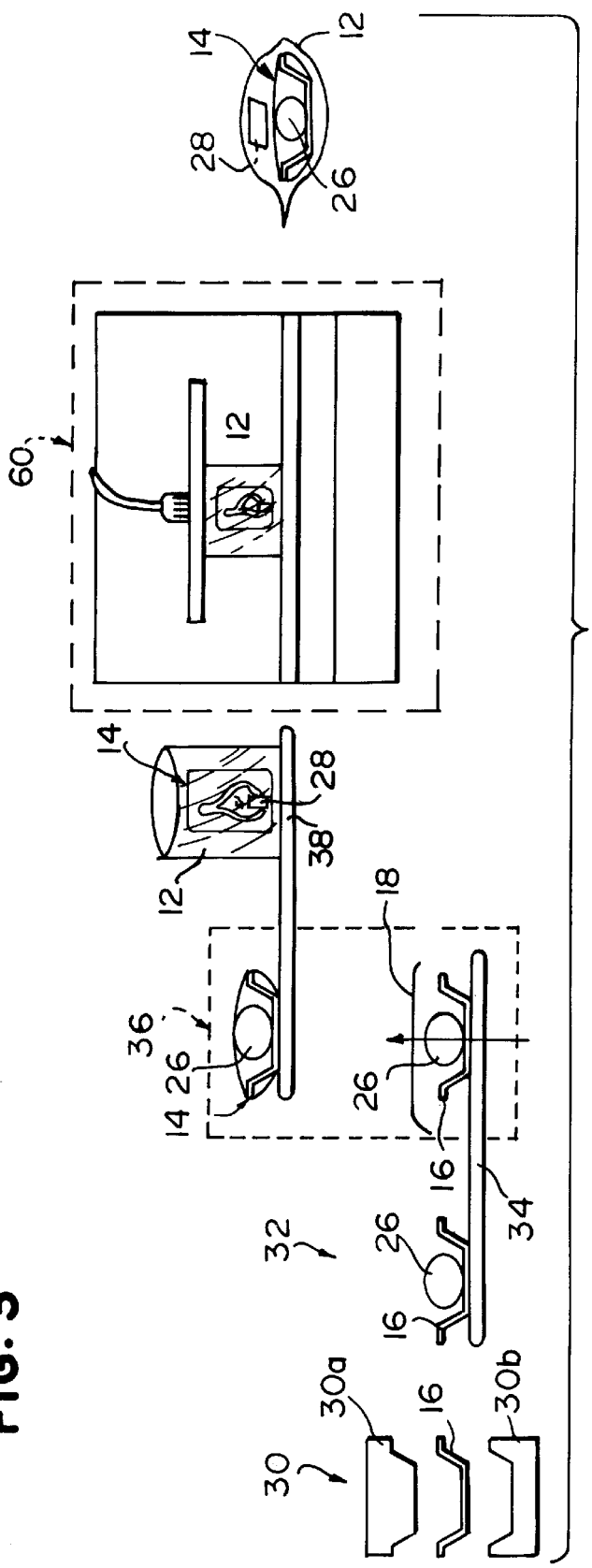

SYSTEM AND METHOD OF MAKING A MODIFIED ATMOSPHERE PACKAGE COMPRISING AN ACTIVATED OXYGEN SCAVENGER FOR PACKAGING MEAT

FIELD OF THE INVENTION

The present invention relates generally to systems and methods of making modified atmosphere packages for extending the shelf life of raw meats or other food. More particularly, the invention relates to such a system and method that is significantly faster than prior art techniques.

BACKGROUND OF THE INVENTION

Containers have long been employed to store and transfer perishable food prior to presenting the food at a market where it will be purchased by the consumer. After perishable foods, such as meats, fruits, and vegetables, are harvested, they are placed into containers to preserve those foods for as long as possible. Maximizing the time in which the food remains preserved in the containers increases the profitability of all entities in the chain of distribution by minimizing the amount of spoilage.

The environment around which the food is preserved is a critical factor in the preservation process. Not only is maintaining an adequate temperature important, but the molecular and chemical content of the gases surrounding the food is significant as well. By providing an appropriate gas content to the environment surrounding the food, the food can be better preserved when maintained at the proper temperature or even when it is exposed to variations in temperature. This gives the food producer some assurance that after the food leaves his or her control, the food will be in an acceptable condition when it reaches the consumer.

Modified atmosphere packaging systems for one type of food, raw meats, exposes these raw meats to either extremely high levels or extremely low levels of oxygen ($O_2$). Packaging systems which provide extremely low levels of oxygen are generally preferable because it is well known that the fresh quality of meat can be preserved longer under anaerobic conditions than under aerobic conditions. Maintaining low levels of oxygen minimizes the growth and multiplication of aerobic bacteria. Heretofore, low-level oxygen systems, such as the systems proposed in U.S. Pat. No. 3,574,642 to Weinke and U.S. Pat. No. 5,115,624 to Garwood, have obtained extremely low levels of oxygen by relying solely upon oxygen evacuation techniques to initially reduce the oxygen level around the raw meat to approximately zero percent.

In typical prior art systems, a package composed of flexible or rigid gas barrier materials is loaded into an evacuation chamber. The package in the evacuation chamber is subjected to a vacuum which reduces the oxygen level to approximately zero percent. After the package is evacuated, the raw meat either can be maintained in a "zero" atmosphere environment (commonly referred to as vacuum packaging) or can be refilled with a gas or mixture of gases to provide a modified atmosphere environment. To provide a modified atmosphere environment, the air-evacuated package is typically filled with a mixture of gases consisting of about 30 percent carbon dioxide ($CO_2$) and 70 percent nitrogen ($N_2$). Refilling the air-evacuated package with such a mixture of gases is believed to suppress the growth of aerobic bacteria. At this point the package is sealed. The meat in the modified atmosphere package takes on a less desirable purple-red color which few consumers would associate with freshness. This purple-red color, however, quickly "blooms" to a bright red color generally associated with freshness when the package is opened to oxygenate the fresh meat by exposure to air. The package is typically opened immediately prior to display of the fresh meat to consumers so as to induce blooming of the fresh meat just prior to display to the consumers.

Low-level oxygen systems relying solely upon evacuation techniques to diminish the oxygen level to approximately zero percent suffer from several disadvantages. For example, such systems operate at exceptionally slow speeds because they rely solely upon the use of an evacuation device along the packaging line to reduce the oxygen level to zero percent. The evacuation process is time-consuming, and the manufacture of the package cannot be completed until after the package has been fully evacuated. Furthermore, the evacuation techniques render it difficult to remove any oxygen within a previously wrapped package, such as an overwrapped meat tray, without creating vents in the package to allow the oxygen to escape. Trapped oxygen raises the residual oxygen level in the package and can also cause billowing and subsequent damage to the package during evacuation.

A need therefore exists for a system and method of making a modified atmosphere package which overcomes the aforementioned shortcomings associated with existing techniques of making those packages.

SUMMARY OF THE INVENTION

Accordingly, the present invention is directed to a system and method of making a modified atmosphere package which is significantly faster than prior art techniques. The packaging system effectively extends the allowable time period between cutting and purchase of retail cuts of raw meat. The raw meat can be cut and packaged several weeks prior to being purchased at the store and yet remains fresh during this time period.

To achieve the foregoing objectives, the packaging system and method utilizes a modified atmosphere package including a first package and a second package. The first package includes a non-barrier portion substantially permeable to oxygen, while the second package is substantially impermeable to oxygen. After a food product such as raw meat is placed within the first package, the first package is sealed and then inserted into the second package without sealing the second package so as to create a pocket between the first and second packages. Next, the oxygen level in the pocket is reduced to a first level greater than zero percent using one or more techniques, including but not limited to evacuation, gas flushing, and oxygen scavenging. The pocket is preferably flushed with one or more gases to create a modified atmosphere therein suitable for suppressing the growth of aerobic bacteria.

To reduce the oxygen level in the pocket from the first level to approximately zero percent, an oxygen scavenger is positioned to absorb any residual oxygen within the package. The oxygen scavenger is activated with an oxygen uptake accelerator to increase the rate at which the oxygen is absorbed. The activated oxygen scavenger aggressively absorbs any residual oxygen within the package after it is sealed.

The above system and method of making a modified atmosphere package is advantageous because it does not rely solely upon time-consuming evacuation techniques to reduce the oxygen level to zero percent. Rather, an oxygen reduction technique such as evacuation, gas flushing, and/or scavenging is only used to quickly reduce the oxygen level to the first non-zero level, while an activated oxygen scavenger is used to further reduce the oxygen level to zero percent. By activating the oxygen scavenger, the scavenger has the aggressiveness required to rapidly move the oxygen level in the package through the pigment sensitive oxygen range of about 0.05 percent to two percent oxygen. In this pigment sensitive range, metmyoglobin can form very quickly. Metmyoglobin is a substance that causes meat to change to an undesirable brown color. Metmyoglobin forms very slowly at oxygen levels above about two percent and below about 0.05 percent but very quickly between these oxygen levels. Accordingly, it is important to pass the meat in the package through the pigment sensitive range very quickly. Activation of the oxygen scavenger insures that such rapid passage through the pigment sensitive range is achieved, thereby preventing discoloration of the meat.

It has been found that the use of evacuation for only part, but not all, of the oxygen reduction process significantly increases the throughput of the manufacturing process relative to prior art systems. The manufacturing process of the present invention is completed after the package is sealed. The oxygen scavenger essentially operates outside the manufacturing process because it continues to absorb oxygen after the package is sealed. As the oxygen scavenger absorbs oxygen in one package, additional packages can be manufactured.

In contrast, in prior art systems that rely solely upon time-consuming evacuation techniques to reduce the oxygen level in the package to about zero percent, the manufacture of the package cannot be completed until after the package is fully evacuated. Additional packages cannot be manufactured on the same manufacturing line until after the package is fully evacuated. Thus, evacuation controls the timing of the manufacturing process. Since evacuation is time-consuming, prior art systems experience a relatively low throughput relative to the system and method of the present invention.

The above summary of the present invention is not intended to represent each embodiment, or every aspect of the present invention. This is the purpose of the figures and detailed description which follow.

BRIEF DESCRIPTION OF THE DRAWINGS

Other objects and advantages of the invention will become apparent upon reading the following detailed description and upon reference to the drawings in which:

FIG. 1 is an isometric view of a modified atmosphere package embodying the present invention;

FIG. 2 is a section view taken generally along line 2—2 in FIG. 1;

FIG. 3 is an enlarged view taken generally along circled portion 3 in FIG. 2;

FIG. 4 is a diagrammatic side view of a system for making the modified atmosphere package in FIG. 1;

Figure 5:
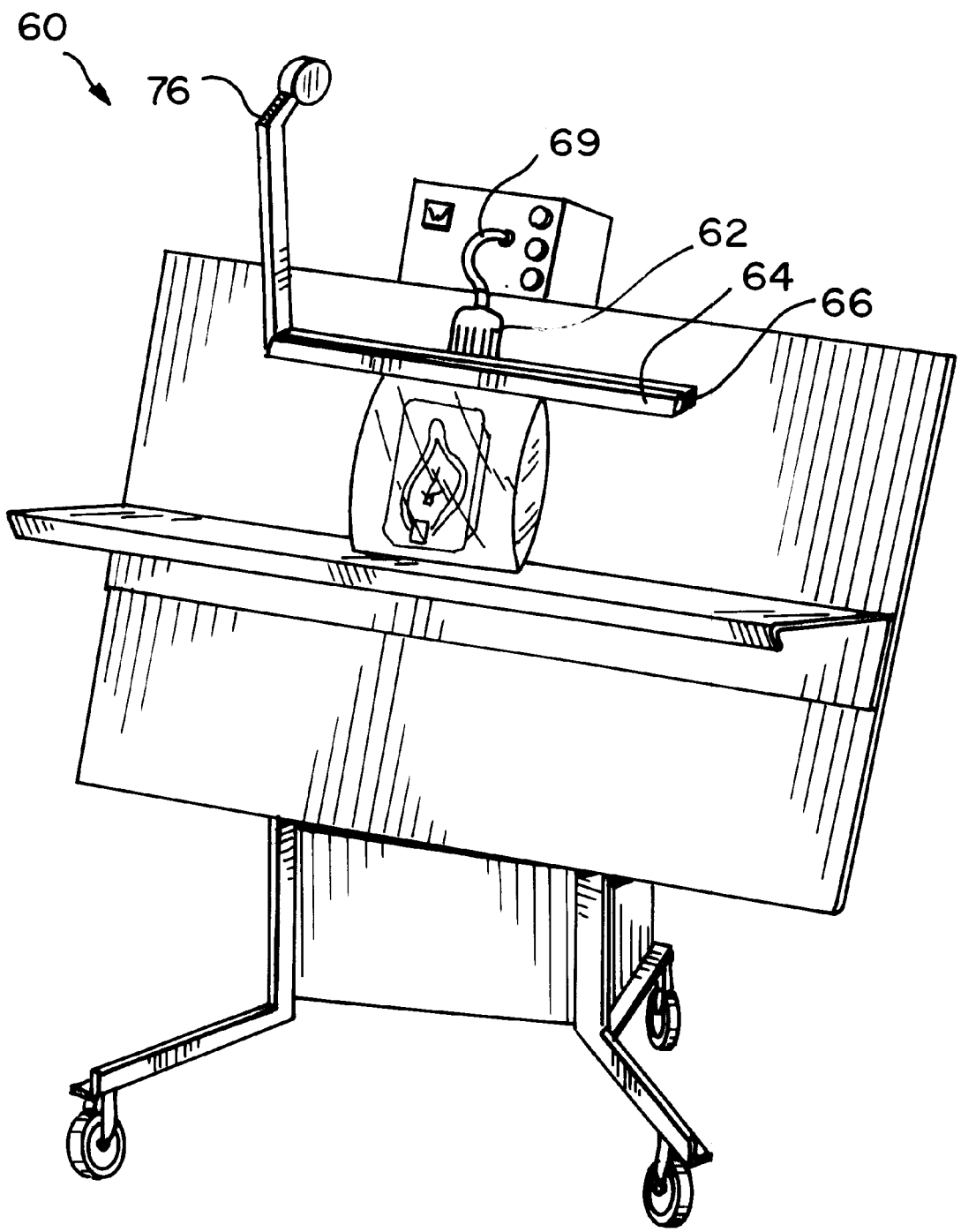
FIG. 5 is an isometric view of an apparatus for evacuating and/or flushing the modified atmosphere package in FIG. 1.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DESCRIPTION OF ILLUSTRATIVE EMBODIMENTS

Turning now to the drawings, FIGS. 1–3 depict a modified atmosphere package 10 including a master outer package 12 and an inner package 14. The term "package" as used herein shall be defined as any means for holding raw meat, including a container, carton, casing, parcel, holder, tray, flat, bag, film envelope, etc. At least a portion of the inner package 14 is permeable to oxygen. The inner package 14 includes a conventional semi-rigid plastic tray 16 thermoformed from a sheet of polymeric material which is substantially permeable to oxygen. Exemplary polymers which may be used to form the non-barrier tray 16 include polystyrene foam, cellulose pulp, polyethylene, polypropylene, etc. In a preferred embodiment, the polymeric sheet used to form the tray 16 is substantially composed of polystyrene foam and has a thickness ranging from about 100 mils to about 300 mils. The use of a common polystyrene foam tray 16 is desirable because it has a high consumer acceptance. The inner package 14 further includes a stretch film wrapping or cover 18 substantially composed of a polymeric material, such as polyvinyl chloride (PVC), which is substantially permeable to oxygen. In a preferred embodiment, the stretch film used to form the cover 18 contains additives which allow the film to cling to itself, has a thickness ranging from about 0.5 mil to about 1.5 mils, and has a rate of oxygen permeability greater than about 1000 cubic centimeters per 100 square inches in 24 hours. Preferably, the film has a rate of oxygen permeability greater than about 7000 cubic centimeters per 100 square inches in 24 hours and, most preferably, the film has a rate of oxygen permeability greater than about 10,000 cubic centimeters per 100 square inches in 24 hours. To help attain this high rate of permeability, small holes may be punched into the film. Other techniques for increasing the oxygen permeability of the inner package 14 may be used. Such techniques are disclosed in U.S. application Ser. No. 09/054,907 entitled "Modified Atmosphere Package With Accelerated Reduction of Oxygen Level in Meat Compartment," filed Apr. 3, 1998, and incorporated herein by reference in its entirety. One preferred stretch film is Resinite™ meat film commercially available from Borden Packaging and Industrial Products of North Andover, Mass.

The tray 16 is generally rectangular in configuration and includes a bottom wall 20, a continuous side wall 22, and a continuous rim or flange 24. The continuous side wall 22 encompasses the bottom wall 20 and extends upwardly and outwardly from the bottom wall 20. The continuous rim 24 encompasses an upper edge of the continuous side wall 22 and projects laterally outwardly therefrom. A food item such as a retail cut of raw meat 26 is located in a rectangular compartment defined by the bottom wall 20 and continuous side wall 22. The raw meat may be any animal protein, including beef, pork, veal, lamb, chicken, turkey, venison, fish, etc. The tray 16 is manually or automatically wrapped with the cover 18. The cover 18 is wrapped over the retail cut of raw meat 26 and about both the side wall 22 and bottom wall 20 of the tray 16. The free ends of the cover 18 are overlapped along the underside of the bottom wall 20 of the tray 16, and, due to the cling characteristic inherent in the cover 18, these overlapping free ends cling to one another to hold the cover 18 in place. If desired, the overwrapped tray 16, i.e., the inner package 14, may be run over a hot plate to thermally fuse the free ends of the cover 18 to one another and thereby prevent these free ends from potentially unraveling.

The master outer package 12 is preferably a flexible polymeric bag composed of a single or multilayer plastics material which is substantially impermeable to oxygen. The master bag 12 may, for example, include a multilayer coextruded film containing ethylene vinyl chloride (EVOH), or include an oriented polypropylene (OPP) core coated with an oxygen barrier coating such as polyvinylidene chloride and further laminated with a layer of sealant material such as polyethylene to facilitate heat sealing. In a preferred embodiment, the polymeric bag 12 is composed of a coextruded barrier film commercially available as product no. 325C44-EX861B from PrintPack, Inc. of Atlanta, Ga. The coextruded barrier film has a thickness ranging from about 2 mils to about 6 mils, and has a rate of oxygen permeability less than about 0.1 cubic centimeters per 100 square inches in 24 hours.

Prior to sealing the master bag 12, the inner package 14 is placed within the polymeric bag 12 without sealing the bag 12 so as to create a pocket 13 between the inner and outer packages 14 and 12. An oxygen scavenger/absorber 28 is then placed in the bag 12 external to the sealed inner package 14. The oxygen scavenger 28 is activated with an oxygen uptake accelerator to increase the rate at which the oxygen is absorbed. The oxygen uptake accelerator is preferably selected from the group consisting of water or aqueous solutions of acetic acid, citric acid, sodium chloride, calcium chloride, magnesium chloride and copper. The non-barrier portion of the inner package 14 allows any oxygen within the inner package 14 to flow into the pocket 13 for absorption by the oxygen scavenger 28.

Further information concerning the oxygen scavenger 28, the oxygen uptake accelerator, and the means for introducing the oxygen uptake accelerator to the oxygen scavenger 28 may be obtained from application Ser. No. 08/856,448 filed May 14, 1997, entitled "Oxygen Scavenger Accelerator," and incorporated herein by reference in its entirety. In the drawings, the oxygen scavenger 28 is illustrated as a packet or label which is inserted into the bag 12 prior to sealing the bag 12. Alternatively, an oxygen scavenging material may be added to the polymer or polymers used to form the outer package 12 so that the oxygen scavenging material is integrated into the outer package 12 itself.

Next, the oxygen level in the pocket 13 is reduced to a first level greater than zero percent. This reduction in the oxygen level may be accomplished using one or more techniques, including but not limited to evacuation, gas flushing, and oxygen scavenging. In a preferred embodiment, the bag 12 is subjected to evacuation and gas flushing cycles to initially reduce the oxygen level in the pocket 13, prior to any equilibration, to no less than about 0.1 percent. Taking into account any oxygen disposed within the the inner package 14, i.e., oxygen disposed within the meat 26 itself, the wall of the tray 16, and the free space beneath the stretch film 18, the oxygen level in the pocket 13 of no less than about 0.1 percent corresponds to an "equilibrium" oxygen level in the entire package 10 of no less than about one to two percent. During the gas flushing process, an appropriate mixture of gases is preferably introduced into the pocket 13 to create a modified atmosphere therein suitable for suppressing the growth of aerobic bacteria. In a preferred embodiment, this mixture of gases consists of about 30 percent carbon dioxide and about 70 percent nitrogen. The master bag 12 is then sealed.

After the master bag 12 is sealed, the activated oxygen scavenger 28 reduces the oxygen level throughout the package 10, including the pocket 13 and the inner package 14, to approximately zero percent in a time period of less than about 24 hours. The oxygen scavenger accelerator insures that the oxygen scavenger 28 has the aggressiveness required to rapidly move the oxygen level in the package 10 and around the meat through the pigment sensitive oxygen range of about 0.05 to two percent. The oxygen scavenger 28 absorbs any residual oxygen in the pocket 13 and the inner package 14 and any oxygen that might seep into the package 10 from the ambient environment.

The retail cut of raw meat 26 within the modified atmosphere package 10 takes on a purple-red color when the oxygen is removed from the interior of the package 10. The meat-filled modified atmosphere package 10 may now be stored in a refrigeration unit for several weeks prior to being offered for sale at a grocery store. A short time (e.g., less than one hour) prior to being displayed at the grocery store, the inner package 14 is removed from the polymeric bag 12 to allow oxygen from the ambient environment to permeate the non-barrier tray 16 and non-barrier cover 18. The purple-red color of the raw meat 26 quickly changes or "blooms" to a generally acceptable bright red color when the raw meat 26 is oxygenated by exposure to air.

FIG. 4 illustrates a modified atmosphere packaging system used to produce the modified atmosphere package 10 in FIGS. 1–3. The packaging system integrates several disparate and commercially available technologies to provide a modified atmosphere for retail cuts of raw meat. The basic operations performed by the packaging system are described below in connection with FIG. 4.

The packaging process begins at a thermoforming station 30 where a tray 16 is thermoformed in conventional fashion from a sheet of polystyrene or other non-barrier polymer using conventional thermoforming equipment. The thermoforming equipment typically includes a male die member 30a and a female die cavity 30b. As is well known in the thermoforming art, the tray 16 is thermoformed by inserting the male die member 30a into the female die cavity 30b with the polymeric sheet disposed therebetween.

The thermoformed tray 16 proceeds to a goods loading station 32 where the tray 16 is filled with a food product such as a retail cut of raw meat 26. The meat-filled tray 16 is then manually carried or transported on a conveyor 34 to a conventional stretch wrapping station 36 where a stretch film 18 is wrapped about the tray 16 to enclose the retail cut of meat 26 therein. The overwrapped tray 16 forms the inner package 14. The stretch wrapping station 36 may be implemented with a compact stretch semi-automatic wrapper commercially available from Hobart Corporation of Troy, Ohio. The inner package 14 may be transported to the location of the master bag 12 by a conveyor 38.

Figure 7:
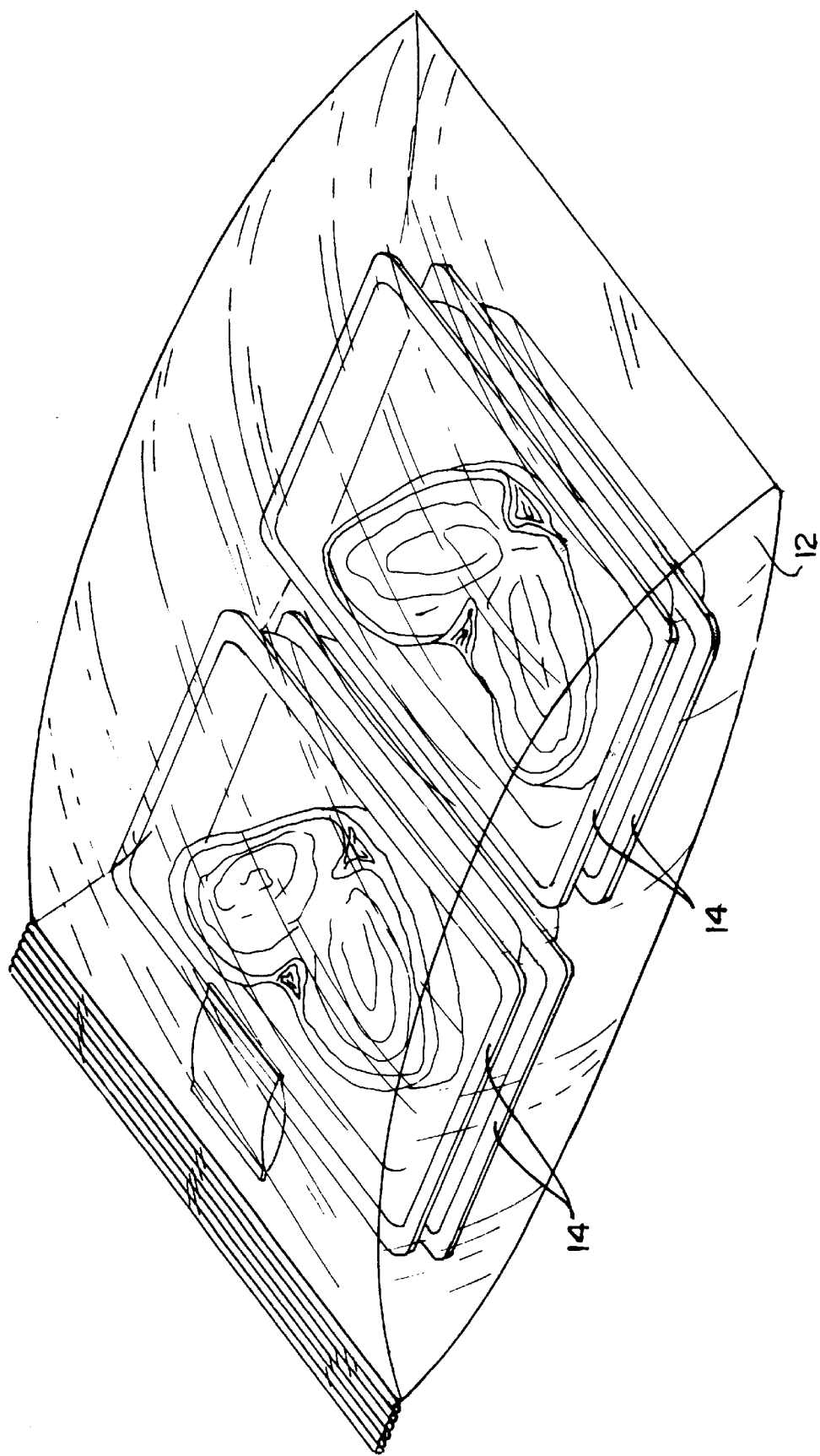
FIG. 7 is an isometric view of a modified atmosphere package akin to that shown in FIG. 1 except that the modified atmosphere package includes a plurality of meat-filled inner packages.

Next, the sealed inner package 14 and the oxygen scavenger 28 are inserted into a master outer bag 12. As shown in FIG. 7, the master bag 12 may be sized to accommodate multiple meat-filled inner packages 14 instead of a single inner package 14. Prior to sealing the master bag 12, the oxygen scavenger 28 is activated with the oxygen scavenger accelerator and then placed in the master bag external to the sealed inner package 14. Although the oxygen scavenger 28 is depicted in the drawings as a packet or label inserted into the master bag 12, an oxygen scavenger may alternatively be integrated into the polymers used to form the bag 12. One preferred oxygen scavenger is a FreshPax™ oxygen absorbing packet commercially available from MultiSorb Technologies, Inc. (formerly Multiform Desiccants Inc.) of Buffalo, N.Y.

Next, the oxygen level in the pocket 13 (FIG. 2) between the inner and outer packages 14 and 12 is reduced to the first level of no less than about 0.1 percent using one or more techniques, including but not limited to evacuation, gas flushing, and oxygen scavenging. As stated above, taking into account any oxygen disposed within the the inner package 14, i.e., oxygen disposed within the meat 26 itself, the wall of the tray 16, and the free space beneath the stretch film 18, this oxygen level in the pocket 13 of no less than about 0.1 percent corresponds to an "equilibrium" oxygen level in the entire package 10 of no less than about one to two percent. In a preferred embodiment, the master bag 12 and the inner package 14 contained therein are conveyed to a vacuum and gas flushing machine 60 that may be implemented with a Corr-vac® machine commercially available from M-Tek Incorporated of Elgin, Ill.

FIGS. 5 and 6a–d illustrate some details of the machine 60. The machine 60 includes an extendable snorkel-like probe 62, a movable seal clamp 64, a stationary seal bar housing 66, and an extendable heated seal bar 68 (FIGS. 6a–d). The probe 62 is disposed adjacent to the seal bar housing 66 and extends between the clamp 64 and the housing 66. The probe 62 is mounted to the machine 60 for movement between an extended position and a retracted position. The probe 62 is connected by piping 69 to both a conventional vacuum pump (not shown) and a gas tank (not shown). A conventional valve is used to select which of the two sources, the pump or the gas tank, is connected to the probe 62. The probe 62 may be open-faced or closed in the form of a tube or pipe. The seal clamp 64 includes a pair of rubber gaskets 70 and 72 and is pivotally movable between an open position spaced away from the seal bar housing 66 and a closed position alongside the seal bar housing 66. The seal bar 68 is situated within the seal bar housing 66 and is connected to an air cylinder 74 used to move the seal bar 68 between a retracted position and an extended sealing position. In its retracted position, the seal bar 68 is hidden within the seal bar housing 66 and is spaced away from the seal clamp 64. In its extended position, the seal bar 68 projects from the seal bar housing 66 applies pressure to the seal clamp 64.

Figure 6A:
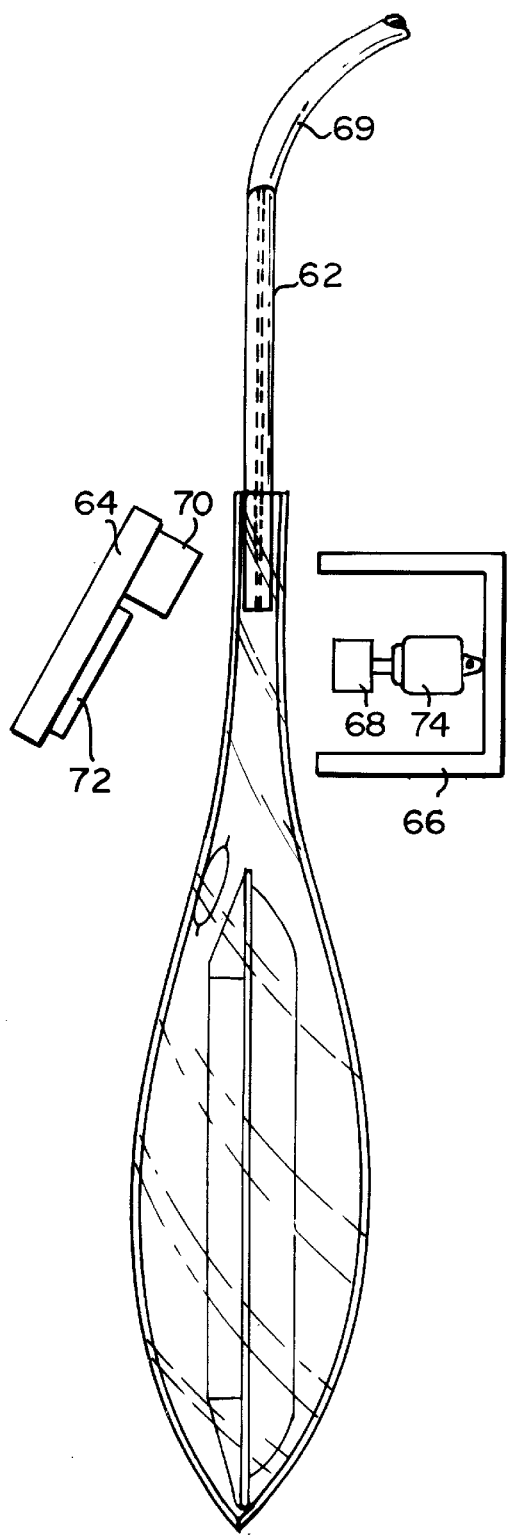
FIGS. 6a–d are cross-sectional views of the apparatus in FIG. 5 showing a method of operation thereof.
Figure 6B:
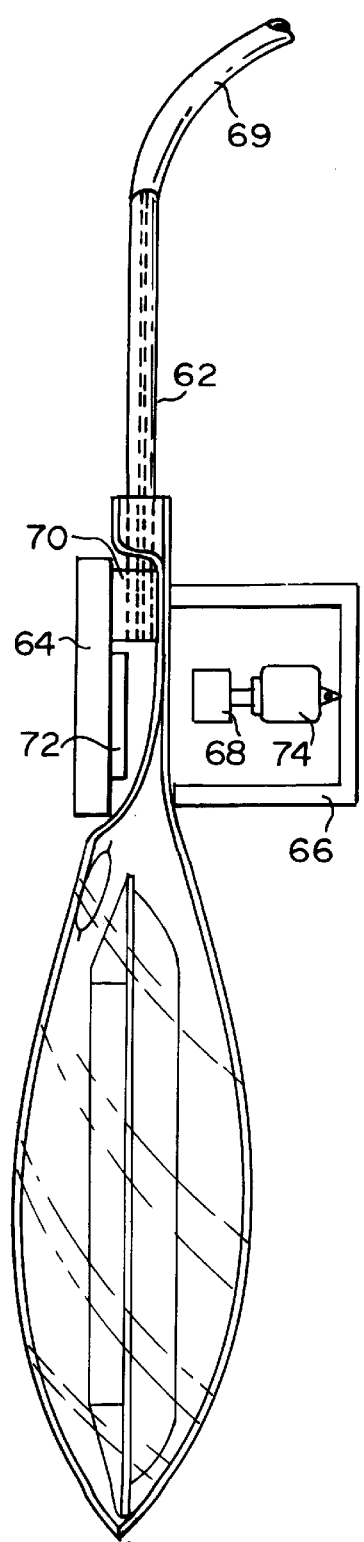

The operation of the machine 60 is described below with reference to FIGS. 6a–d. As shown in FIG. 6a, the bag loading position requires the probe 62 to be in its retracted position, the seal clamp 64 to be in the open position, and the seal bar 66 to be in its retracted position. To load the master bag 12 on the machine 60, the master bag 12 is positioned such that an unsealed end of the bag 12 is disposed between the open seal clamp 64 and the seal bar housing 66 and such that the retracted probe 62 extends into the bag 12 via its unsealed end. Referring to FIG. 6b, using the handle 76 (FIG. 5), the seal clamp 64 is manually moved to its closed position such that the unsealed end of the bag 12 is secured between the seal clamp 64 and the seal bar housing 66.

Figure 6C:
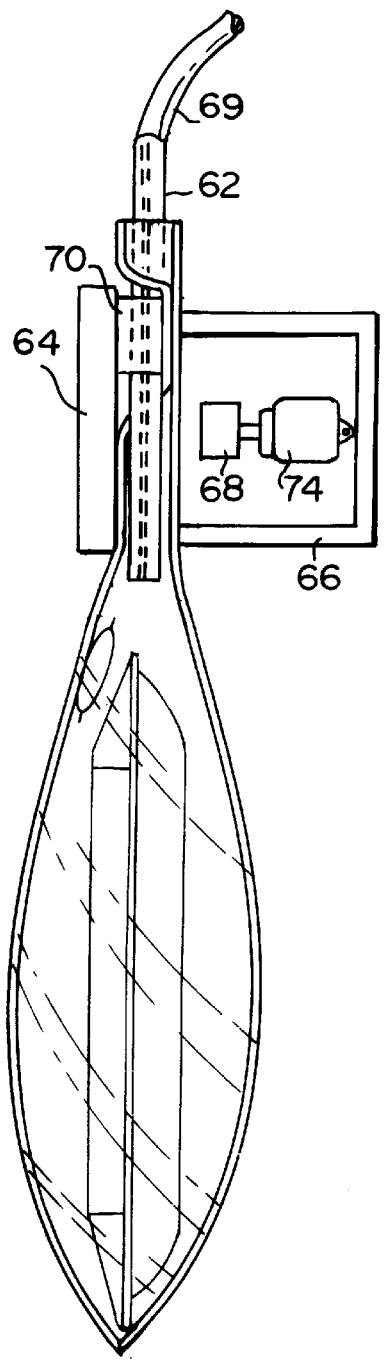

Referring to FIG. 6c, with the seal clamp 64 still closed, the probe 62 is moved to its extended position such that the probe 62 projects deeper into the bag 12 via its unsealed end. The gasket 70 is interrupted at the location of the probe 62 to accommodate the probe 62 and, at the same time, prevent air from the ambient environment from entering the bag 12. After the probe 62 is moved to its extended position, the master bag 12 is subjected to evacuation and gas flushing cycles to reduce the oxygen level within the pocket 13 (FIG. 2) to no less than about 0.1 percent, which, as stated above, corresponds to an "equilibrium" oxygen level in the entire package 10 of no less than about one to two percent. The master bag 12 is first partially evacuated by connecting the probe 62 to the vacuum pump (not shown) and operating the vacuum pump. The machine 60 is preferably programmed to achieve a vacuum level of approximately 11 to 13 inches of mercury on the mercury scale. For the sake of comparison, a full vacuum corresponds to approximately 28 to 30 inches of mercury. Once the master bag 12 reaches the programmed vacuum level, the machine 60 triggers a gas flushing cycle in which the probe 62 is connected to the gas tank (not shown) and a mixture of gases is introduced into the master bag 12. The gas mixture preferably consists of about 30 percent carbon dioxide and about 70 percent nitrogen. The gas mixture creates a modified atmosphere in the pocket 13 (FIG. 2) suitable for suppressing the growth of aerobic bacteria.

Figure 6D:
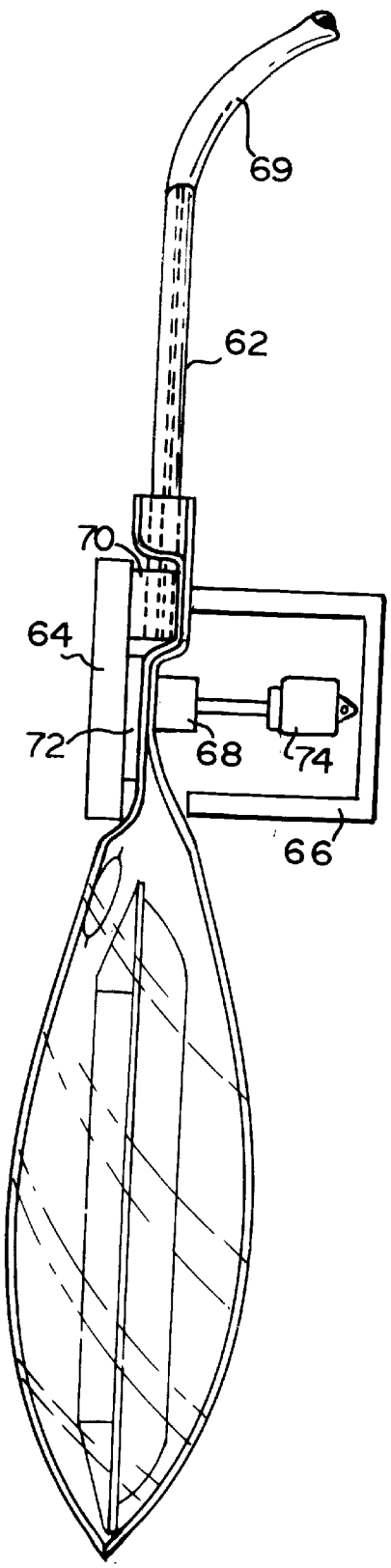

Referring to FIG. 6d, after subjecting the master bag 12 to evacuation and gas flushing cycles, the probe 62 is retracted and the air cylinder 74 is actuated to move the seal bar 68 to its extended position. The heated seal bar 68 presses the unsealed end of the master bag 12 against the rubber gasket 72 for an amount of time sufficient to thermally fuse the opposing films of the bag 12 together and thereby seal the bag 12. The seal bar 68 is then retracted into the seal bar housing 66 and the clamp 64 is opened to release the sealed bag 12.

After the bag 12 is sealed, the activated oxygen scavenger 28 within the sealed bag 12 continues to absorb any residual oxygen within the modified atmosphere package 10 until the oxygen level with the package 10 is reduced to approximately zero percent. In particular, the oxygen scavenger 28 absorbs (1) any residual oxygen remaining in the pocket 13 after the master bag 12 is subjected to the evacuation and gas flushing cycles applied by the machine 60 in FIGS. 5 and 6a–d; (2) any oxygen entering the pocket 13 from the inner package 14; and (3) any oxygen from the ambient environment that might permeate the master bag 12. Activation of the oxygen scavenger 28 insures that the oxygen level is reduced to approximately zero percent at a rate sufficient to suppress the growth of metmyoglobin, thereby preventing the discoloration of the raw meat within the inner package 14. As stated above, the pigment sensitive oxygen range in which the growth of metmyoglobin is accelerated is from about 0.05 percent to two percent oxygen. Activation of the oxygen scavenger 28 allows the scavenger 28 to rapidly pass the oxygen level through this pigment sensitive range and then lower the oxygen level in the modified atmosphere package 10 to approximately zero percent in less than about 24 hours.

The modified atmosphere packaging system in FIG. 4 can produce the modified atmosphere packages 10 at cycle rates ranging from about three to six packages per minute, where the master bag 12 in each package 10 contains one to twelve inner packages 14. The maximum cycle rates which can be attained by the system in FIG. 4 are significantly higher than the cycle rates which can be achieved by prior art systems. The attainment of high cycle rates is largely due to the fact that the packaging system in FIG. 4 relies upon evacuation or other oxygen reduction equipment to remove most, but not all, of the oxygen from the package, and then relies upon the activated oxygen scavenger to absorb any residual oxygen in the package after the manufacture thereof has been completed. In contrast, prior art systems rely solely upon evacuation equipment to reduce the oxygen level to zero percent. The manufacture of prior art packages cannot be completed until after the evacuation equipment has completed its cycle. Reducing oxygen levels in the modified atmosphere package 10 of the present invention by first reducing the oxygen level in the package 10 using evacuation, flushing, and/or some other oxygen reduction technique and then subsequently reducing the oxygen level to zero percent using the activated oxygen scavenger 28 is significantly faster than the prior art's reliance upon slow evacuation techniques to carry out the entire oxygen reduction process.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of manufacturing a modified atmosphere package, comprising:

supplying a first package including a non-barrier portion substantially permeable to oxygen;

placing a retail cut of raw meat within said first package;

sealing said first package;

supplying a second package substantially impermeable to oxygen;

covering said first package with said second package without sealing said second package so as to create a pocket between said first and second packages;

supplying an oxygen scavenger;

activating said oxygen scavenger with an oxygen scavenger accelerator;

positioning said oxygen scavenger external to said first package such that said oxygen scavenger is capable of absorbing oxygen within said pocket;

removing oxygen from said pocket so as to reduce an oxygen level therein to a non-zero level; and sealing said second package, said activated oxygen scavenger aggressively absorbing any residual oxygen in said modified atmosphere package so as to reduce the oxygen level from said non-zero level to approximately zero percent.

2. The method of claim 1, wherein said non-zero oxygen level within said pocket is no less than about 0.1 percent oxygen.

3. The method of claim 1, wherein said step of removing oxygen from said pocket includes evacuating said pocket.

4. The method of claim 3, wherein said step of evacuating said pocket is performed using a vacuum device having a probe and a pair of clamping members, said step of evacuating said pocket including inserting said probe into an unsealed end of said second package, closing said clamping members to clamp said unsealed end of said second package with said probe disposed between said clamping members, and drawing oxygen out of said pocket via said probe.

5. The method of claim 3, wherein said step of removing oxygen from said pocket includes flushing said pocket with one or more gases.

6. The method of claim 5, wherein said steps of evacuating said pocket and flushing said pocket are performed using a vacuum/flushing device having a probe and a pair of clamping members, said steps of evacuating said pocket and flushing said pocket including inserting said probe into an unsealed end of said second package, closing said clamping members to clamp said unsealed end of said second package with said probe disposed between said clamping members, drawing oxygen out of said pocket via said probe, and introducing one or more gases into said pocket via said probe.

7. The method of claim 4, wherein said step of sealing said second package is performed using said vacuum device, said vacuum device including a heated seal bar housed within one of said clamping members, said step of sealing said second package including actuating said seal bar to press against the other of said clamping members with said unsealed end of said second package disposed therebetween and then retracting said seal bar away from said other of said clamping members.

8. The method of claim 6, wherein said step of sealing said second package is performed using said vacuum/flushing device, said vacuum/flushing device including a heated seal bar housed within one of said clamping members, said step of sealing said second package including actuating said seal bar to press against the other of said clamping members with said unsealed end of said second package disposed therebetween and then retracting said seal bar away from said other of said clamping members.

9. The method of claim 1, wherein said activated oxygen scavenger reduces the oxygen level within said modified atmosphere package from said non-zero level to approximately zero percent in less than about 24 hours.

10. A method for removing oxygen from a modified atmosphere package including a first package and a second package, said first package containing a retail cut of raw meat and including a non-barrier portion substantially permeable to oxygen, said second package covering said first package and being substantially impermeable to oxygen, said second package creating a pocket between said first and second packages, said method comprising:

supplying an oxygen scavenger;

activating said oxygen scavenger with an oxygen scavenger accelerator;

positioning said oxygen scavenger external to said first package such that said oxygen scavenger is capable of absorbing oxygen within said pocket;

removing oxygen from said pocket so as to reduce an oxygen level therein to a non-zero level; and sealing said second package, said activated oxygen scavenger aggressively absorbing any residual oxygen in said modified atmosphere package so as to reduce the oxygen level from said non-zero level to approximately zero percent.

11. The method of claim 10, wherein said non-zero oxygen level within said pocket is no less than about 0.1 percent oxygen.

12. The method of claim 10, wherein said step of removing oxygen from said pocket includes evacuating said pocket.

13. The method of claim 12, wherein said step of removing oxygen from said pocket includes flushing said pocket with one or more gases.

14. A system for removing oxygen from a modified atmosphere package including a first package and a second package, said first package containing a retail cut of raw meat and including a non-barrier portion substantially permeable to oxygen, said second package covering said first package and being substantially impermeable to oxygen, said second package creating a pocket between said first and second packages, said system comprising:

means for removing oxygen from said pocket prior to sealing said second package so as to reduce an oxygen level therein to a non-zero level; and an oxygen scavenger, positioned external to said first package and activated with an oxygen scavenger accelerator, for aggressively absorbing any residual oxygen in said modified package after sealing said second package so as to reduce the oxygen level from said non-zero level to approximately zero percent.

15. The system of claim 14, wherein said non-zero oxygen level within said pocket is no less than about 0.1 percent oxygen.

16. The system of claim 14, wherein said means for removing oxygen from said pocket includes means for evacuating said pocket.

17. The system of claim 16, wherein said means for evacuating said pocket includes a probe and a pair of clamping members, and wherein to operate said evacuating means, said probe is inserted into an unsealed end of said second package, said clamping members are closed to clamp said unsealed end of said second package with said probe disposed between said clamping members, and said evacuating means is activated to draw oxygen out of said pocket via said probe.

18. The system of claim 16, wherein said means for removing oxygen from said pocket includes means for flushing said pocket with one or more gases.

19. The system of claim 18, wherein said evacuating means and said flushing means include a vacuum/flushing device having a probe and a pair of clamping members, and wherein to operate said vacuum/flushing device, said probe is inserted into an unsealed end of said second package, said clamping members are closed to clamp said unsealed end of said second package with said probe disposed between said clamping members, said vacuum/flushing device is activated to draw oxygen out of said pocket via said probe, and said vacuum/flushing device is activated to introduce one or more gases into said pocket via said probe.

20. The system of claim 17, further including means for sealing said second package, said evacuating means including said sealing means, said sealing means including a heated seal bar housed within one of said clamping members, and wherein to operate said sealing means, said seal bar is first actuated to press against the other of said clamping members with said unsealed end of said second package disposed therebetween and is then retracted away from said other of said clamping members.

21. The system of claim 19, further including means for sealing said second package, said vacuum/flushing device including said sealing means, said sealing means including a heated seal bar housed within one of said clamping members, and wherein to operate said sealing means, said seal bar is first actuated to press against the other of said clamping members with said unsealed end of said second package disposed therebetween and is then retracted away from said other of said clamping members.

22. The system of claim 14, wherein said activated oxygen scavenger reduces the oxygen level within said modified atmosphere package from said non-zero level to approximately zero percent in less than about 24 hours.

* * * * *

UNITED STATES PATENT AND TRADEMARK OFFICE
CERTIFICATE OF CORRECTION

| | |
|---|---|
| PATENT NO. | : 6,231,905 B1 |
| DATED | : May 15, 2001 |
| INVENTOR(S) | : DelDuca et al. |

It is certified that error appears in the above-identified patent and that said Letters Patent is hereby corrected as shown below:

<u>Title page,</u>
Assignee, should read as follows: -- Tenneco Packaging Specialty and Consumer Products Inc, Lake Forest, Illinois --

Signed and Sealed this

Twenty-first Day of May, 2002

Attest:

*Attesting Officer*

JAMES E. ROGAN
*Director of the United States Patent and Trademark Office*

(12) EX PARTE REEXAMINATION CERTIFICATE (10573rd)

United States Patent
DelDuca et al.

(10) Number: US 6,231,905 C1
(45) Certificate Issued: Apr. 24, 2015

(54) SYSTEM AND METHOD OF MAKING A MODIFIED ATMOSPHERE PACKAGE COMPRISING AN ACTIVATED OXYGEN SCAVENGER FOR PACKAGING MEAT

(75) Inventors: Gary R. DelDuca, Canandaigua, NY (US); Alan E. Deyo, Rushville, NY (US); Vinod K. Luthra, Pittsford, NY (US); Wen P. Wu, Pittsford, NY (US)

(73) Assignee: PACTIV CORPORATION, Lake Forest, IL (US)

Reexamination Request:
No. 90/011,132, Aug. 3, 2010

Reexamination Certificate for:
Patent No.: 6,231,905
Issued: May 15, 2001
Appl. No.: 09/168,659
Filed: Oct. 8, 1998

Certificate of Correction issued May 21, 2002

(51) Int. Cl.
*A23L 3/34* (2006.01)
*A23L 3/3436* (2006.01)
*B65B 31/04* (2006.01)
*B65B 31/06* (2006.01)

(52) U.S. Cl.
CPC .............. *A23L 3/3436* (2013.01); *B65B 31/06* (2013.01)

(58) Field of Classification Search
None
See application file for complete search history.

(56) References Cited

To view the complete listing of prior art documents cited during the proceeding for Reexamination Control Number 90/011,132, please refer to the USPTO's public Patent Application Information Retrieval (PAIR) system under the Display References tab.

*Primary Examiner* — Krisanne Jastrzab

(57) ABSTRACT

A packaging system and method utilizes a modified atmosphere package including a first package and a second package. The first package includes a non-barrier portion substantially permeable to oxygen, while the second package is substantially impermeable to oxygen. After a food product such as raw meat is placed within the first package, the first package is sealed and then inserted into the second package without sealing the second package so as to create a pocket between the first and second packages. The system and method first employ an oxygen reduction technique such as evacuation, gas flushing, and/or scavenging to quickly reduce the oxygen level in the pocket to a first non-zero level, and then employ an activated oxygen scavenger to further reduce the oxygen level to zero percent after the package is sealed. The oxygen scavenger is activated with an oxygen uptake accelerator to increase the rate at which the oxygen is absorbed. The oxygen scavenger is positioned external to the first package to aggressively absorb any residual oxygen within the pocket and the first package and absorb any oxygen that might seep into the modified atmosphere package.

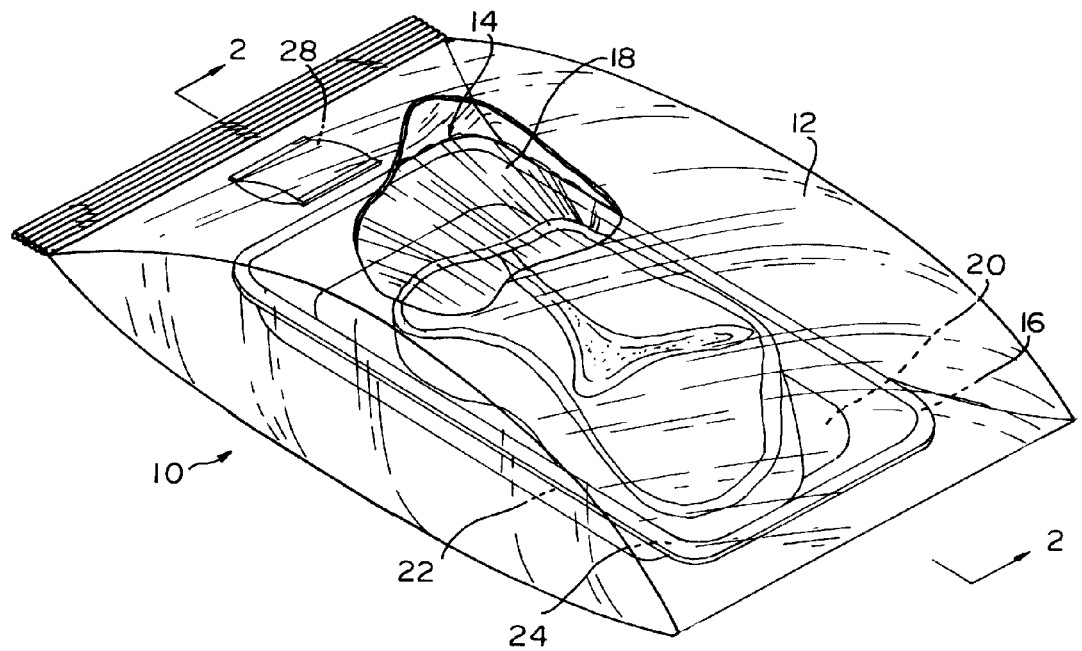

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-22 are cancelled.

\* \* \* \* \*